(12) United States Patent
Kim

(10) Patent No.: US 10,073,298 B2
(45) Date of Patent: Sep. 11, 2018

(54) LIQUID CRYSTAL DISPLAY AND MANUFACTURING METHOD THEREOF

(71) Applicant: Samsung Display Co., Ltd., Yongin-si (KR)

(72) Inventor: Sung-Yi Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 87 days.

(21) Appl. No.: 15/071,685

(22) Filed: Mar. 16, 2016

(65) Prior Publication Data

US 2016/0274389 A1    Sep. 22, 2016

(30) Foreign Application Priority Data

Mar. 16, 2015   (KR) .................. 10-2015-0036154

(51) Int. Cl.
*G02F 1/1337* (2006.01)
*G02F 1/1333* (2006.01)
*G02F 1/1362* (2006.01)

(52) U.S. Cl.
CPC ...... *G02F 1/1337* (2013.01); *G02F 1/133753* (2013.01); *G02F 1/133788* (2013.01); *G02F 1/133707* (2013.01); *G02F 1/136213* (2013.01); *G02F 2001/133368* (2013.01); *G02F 2001/133397* (2013.01); *G02F 2001/133742* (2013.01); *G02F 2001/133749* (2013.01); *G02F 2001/133757* (2013.01); *G02F 2001/133761* (2013.01); *G02F 2001/133773* (2013.01);

(Continued)

(58) Field of Classification Search
CPC ... G02F 2001/133773; G02F 1/133753; G02F 2001/133757; G02F 1/133788
See application file for complete search history.

(56) References Cited

U.S. PATENT DOCUMENTS 8,673,272 B2    3/2014  Shih et al.
2009/0161048 A1*  6/2009  Satake .............. G02F 1/133305
                                                   349/110

(Continued)

FOREIGN PATENT DOCUMENTS

JP    2005-206617    8/2005
JP    2013-130639    7/2013

(Continued)

OTHER PUBLICATIONS

Extended European Search Report dated Aug. 12, 2016, in European Patent Application No. 16160561.3.

(Continued)

*Primary Examiner* — Michael Caley
*Assistant Examiner* — Mariam Qureshi
(74) *Attorney, Agent, or Firm* — H.C. Park & Associates, PLC

(57) ABSTRACT

A liquid crystal display (LCD) includes a first substrate, a gate line and a data line disposed on the first substrate, a pixel electrode connected to the gate line and the data line, a first alignment layer disposed on the pixel electrode, a second substrate opposite to the first substrate, a common electrode disposed on the second substrate, and a second alignment layer disposed on the common electrode, in which a thickness of the first alignment layer is greater than a thickness of the second alignment layer.

20 Claims, 16 Drawing Sheets

(52) U.S. Cl.
CPC ............ *G02F 2001/136222* (2013.01); *G02F 2001/136231* (2013.01)

(56) References Cited

U.S. PATENT DOCUMENTS

| | | | |
|---|---|---|---|
| 2011/0157531 A1* | 6/2011 | Suwa | C09K 19/56 349/124 |
| 2012/0252299 A1 | 10/2012 | Shen et al. | |
| 2013/0335687 A1* | 12/2013 | Shen | G02F 1/133753 349/126 |
| 2016/0170268 A1* | 6/2016 | Song | G02F 1/133707 349/123 |

FOREIGN PATENT DOCUMENTS

| | | |
|---|---|---|
| KR | 10-2008-0026827 | 3/2008 |
| KR | 10-2011-0024509 | 3/2011 |

OTHER PUBLICATIONS

Extended European Search Report dated Apr. 20, 2018, issued in European Patent Application No. 18159651.1.

\* cited by examiner

LIQUID CRYSTAL DISPLAY AND MANUFACTURING METHOD THEREOF

CROSS-REFERENCE TO RELATED APPLICATION

This application claims priority from and the benefit of Korean Patent Application No. 10-2015-0036154, filed on Mar. 16, 2015, which is hereby incorporated by reference for all purposes as if fully set forth herein.

BACKGROUND

Field

Exemplary embodiments of the present invention relate to a liquid crystal display and a manufacturing method of the liquid crystal display.

Discussion of the Background

A liquid crystal display, which may be one of the most widely used flat panel displays, includes two substrates with field generating electrodes such as a pixel electrode and a is common electrode, and a liquid crystal layer interposed therebetween.

Among liquid crystal displays, a vertical alignment liquid crystal display, in which a long axis of liquid crystal molecules is arranged perpendicular to a surface of a substrate, a light viewing angle mode may be implemented, and various methods for initially aligning the liquid crystal molecules have been proposed, such that the liquid crystal molecules may have a pretilt angle to increase a response speed of the liquid crystal display. Among the initial alignment methods, a method for pretilting liquid crystal molecules by using prepolymers, which may be polymerized by light such as ultraviolet light, may apply a desired voltage to field generating electrodes and expose the prepolymers to light.

Recently, liquid crystal displays may be becoming wider, and curved display devices are being developed to increase immersion and realism for viewers. When two substrates of the display devices are misaligned during initial alignment of liquid crystal molecules, the pretilt direction of the liquid crystal molecules may become irregular in boundaries of domains where the liquid crystal molecules are aligned in different directions, which may deteriorate display quality therein.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a display device and a manufacturing method thereof for preventing deterioration of display quality, when two substrates of the display device are misaligned during initial alignment of liquid crystal molecules, by preventing a pretilt direction of liquid crystal molecules from becoming irregular in boundaries of domains.

Additional aspects will be set forth in the detailed description which follows, and, in part, will be apparent from the disclosure, or may be learned by practice of the inventive concept.

According to an exemplary embodiment of the present invention, a liquid crystal display (LCD) includes a first substrate, a gate line and a data line disposed on the first substrate, a pixel electrode connected to the gate line and the data line, a first alignment layer disposed on the pixel electrode, a second substrate opposing the first substrate, a common electrode disposed on the second substrate, and a second alignment layer disposed on the common electrode, in which a thickness of the first alignment layer is greater than a thickness of the second alignment layer.

The first alignment layer may include first photo-polymerization protrusions, the second alignment layer may include second photo-polymerization protrusions, and a density and a size of the first photo-polymerization protrusions may be greater than a density and a size of the second photo-polymerization protrusions.

The liquid crystal display (LCD) may have a curvature.

An axis of the curvature may be parallel to at least one extending direction of the gate line and the data line.

The liquid crystal display (LCD) may further include a liquid crystal layer disposed between the first substrate and the second substrate, and the liquid crystal layer may include ultraviolet (UV) light absorption particles.

According to an exemplary embodiment of the present invention, a liquid crystal display (LCD) includes a first substrate, a gate line and a data line disposed on the first substrate, a pixel electrode connected to the gate line and the data line, an alignment layer disposed on the pixel electrode layer, a second substrate opposing the first substrate, and a common electrode disposed on the second substrate, in which the alignment layer may not be formed on the common electrode, and the alignment layer may include photo-polymerization protrusions.

According to an exemplary embodiment of the present invention, a manufacturing method of a liquid crystal display includes forming a display panel including a first substrate and a second substrate opposing each other and a liquid crystal layer disposed between the first substrate and the second substrate, and applying ultraviolet (UV) light to the display panel in a direction toward the second substrate from the first substrate to form a first alignment layer on the first substrate and a second alignment layer on the second substrate, in which a thickness of the first alignment layer is greater than a thickness of the second alignment layer.

The manufacturing method of the liquid crystal display (LCD) may further include applying an external force to the display panel after forming the first alignment layer and the second alignment layer, such that the display panel may have a curvature.

The manufacturing method may further include forming a gate line and a data line on the first substrate, in which an axis of the curvature of the display panel may be parallel to at least one extending direction of the gate line and the data line.

The liquid crystal layer may further include ultraviolet (UV) light absorption particles.

According to an exemplary embodiment of the present invention, a manufacturing method of a liquid crystal display includes forming a display panel including a first substrate and a second substrate opposing each other and a liquid crystal layer disposed between the first substrate and the second substrate, and applying ultraviolet (UV) light to the display panel in a direction toward the second substrate from the first substrate to form an alignment layer on the first substrate, the alignment layer including photo-polymerization protrusions, in which the ultraviolet light is absorbed by the liquid crystal layer so as not to reach the second substrate.

According to a display device and a manufacturing method of the display device of an exemplary embodiment of the present invention, deterioration of display quality in a region adjacent to a domain boundary may be prevented when two initially aligned substrates are misaligned.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
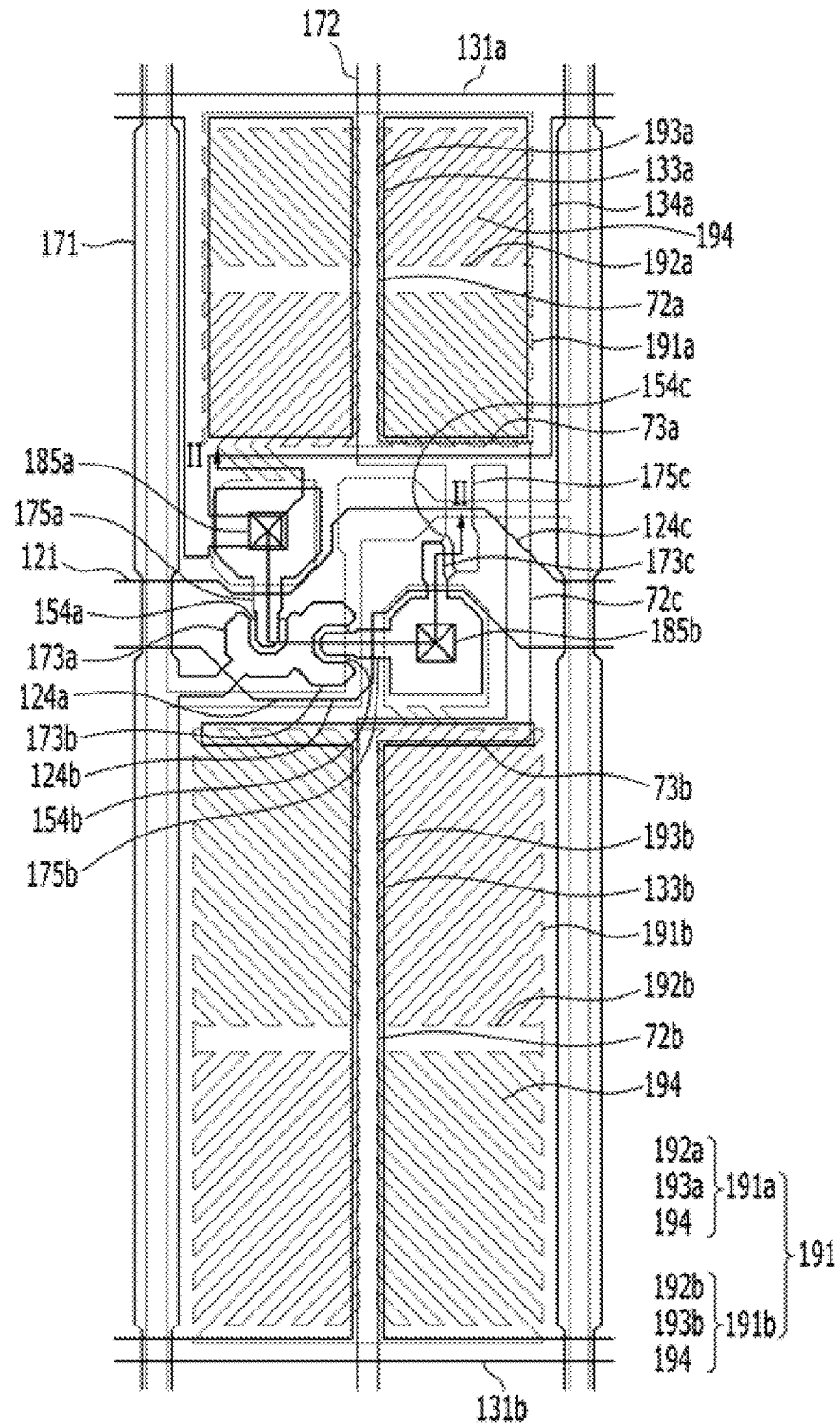
FIG. 1 is a layout view of one pixel of a liquid crystal display according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
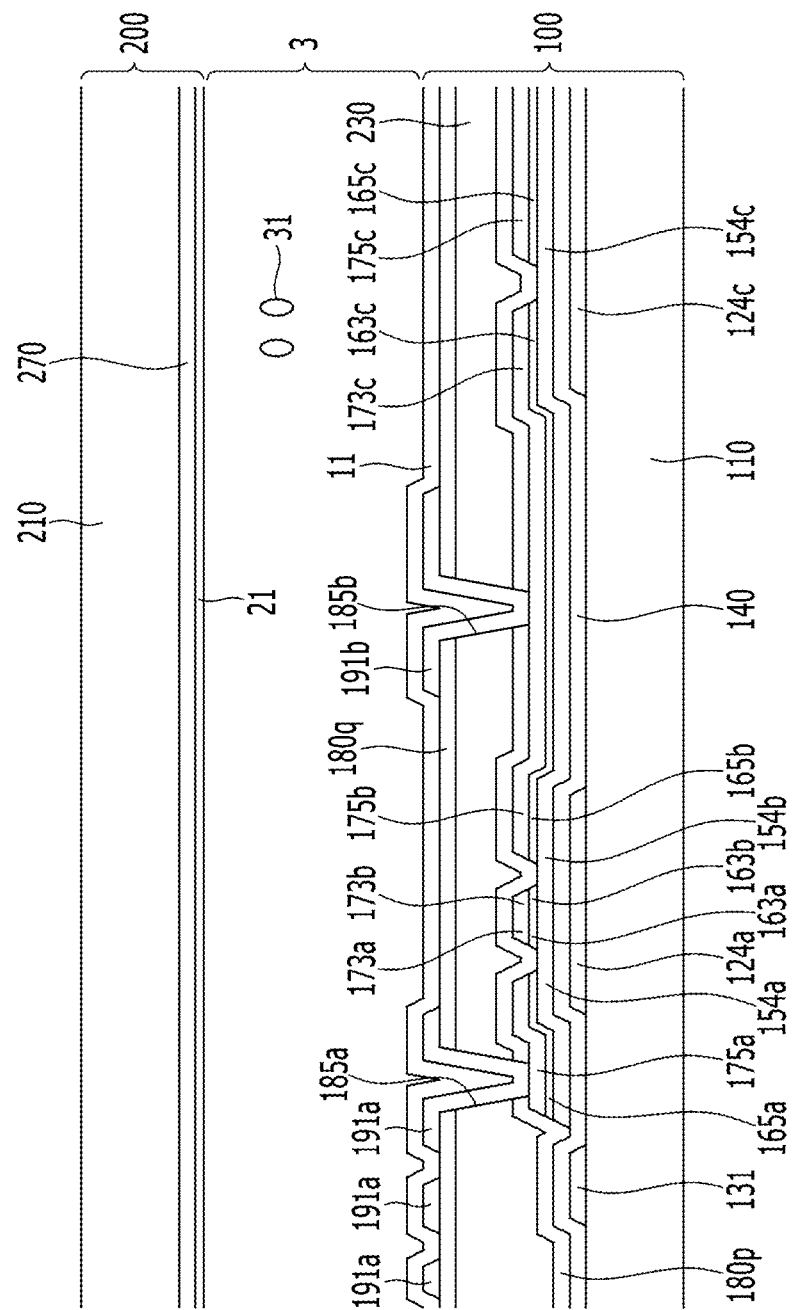
FIG. 2 is a cross-sectional view of the liquid crystal display of FIG. 1 taken along line II-II.
Figure 3:
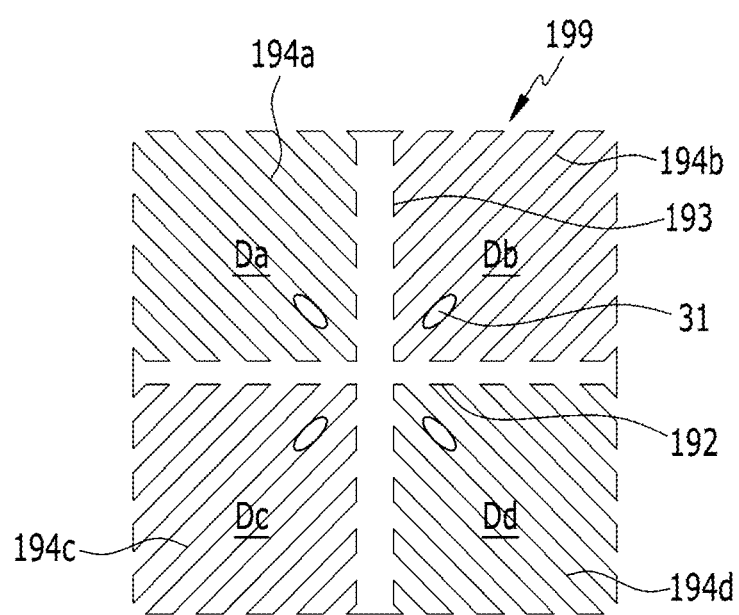
FIG. 3 is a top plan view illustrating a basic region of a pixel electrode of a liquid crystal display according to an exemplary embodiment of the present invention.

A liquid crystal display according to an exemplary embodiment of the present invention will be described with reference to FIG. 1 to FIG. 3. FIG. 1 is a layout view of one pixel of a liquid crystal display according to an exemplary embodiment of the present invention, FIG. 2 is a cross-sectional view of the liquid crystal display of FIG. 1 taken along line II-II, and FIG. 3 is a top plan view illustrating a basic region of a pixel electrode of a liquid crystal display according to an exemplary embodiment of the present invention.

The liquid crystal display according to the present exemplary embodiment includes a first display panel 100 and a second display panel 200 facing each other, a liquid crystal layer 3 interposed between the first and second display panels 100 and 200, and a pair of polarizers (not shown) attached to outer surfaces of the first and second display panels 100 and 200.

In the first display panel 100, a gate conductor including a gate line 121 and storage voltage lines 131a and 131b is formed on an insulation substrate made of transparent glass or plastic. The gate line 121 includes a first gate a, a second gate electrode 124b, and a third gate electrode 124c. The storage voltage lines 131a and 131b include a first storage voltage line 131a and a second storage voltage line 131b. The first storage voltage line 131a includes a first storage electrode 133a and a second storage electrode 134a, and the second storage voltage line 131b includes a third storage electrode 133b.

A gate insulating layer 140 is formed on the gate line 121 and the storage voltage lines 131a and 131b. A first semiconductor 154a, a second semiconductor 154b, and a third semiconductor 154c are formed on the gate insulating layer 140. Ohmic contacts 163a, 165a, 163b, 165b, 163c, and 165c are formed on the semiconductors 154a, 154b, and 154c.

A data conductor including a data line 171, a division voltage reference voltage line 172, a first source electrode 173a, a second source electrode 173b, a first drain electrode 175a, a second drain electrode 175b, a third source electrode 173c, and a third drain electrode 175c are formed on the ohmic contacts 163a, 165a, 163b, 165b, 163c, and 165c and the gate insulating layer 140. The first source electrode 173a and the second source electrode 173b extend from the data line 171. The third drain electrode 175c extends from the division voltage reference voltage line 172.

The division voltage reference voltage line 172 includes a first longitudinal portion 72a extending parallel to the data line 171 and overlapping the first storage electrode 133a, a second longitudinal portion 72b overlapping the third storage electrode 133b, a third longitudinal portion 72c connecting the first longitudinal portion 72a and the second longitudinal portion 72b to each other, a first transverse portion 73a connecting the first longitudinal portion 72a and the third longitudinal portion 72c to each other, and a second transverse portion 73b connecting the second longitudinal portion 72b and the third longitudinal portion 72c to each other. The data conductor, the semiconductors 154a, 154b, and 154c, and the ohmic contacts 163a, 165a, 163b, 165b, 163c, and 165c disposed under the data conductor may be simultaneously formed by using one mask.

The first gate electrode 124a, the first source electrode 173a, and the first drain electrode 175a form a first thin-film transistor (TFT) Qa along with the first semiconductor 154a formed as an island, and a channel of the first thin-film transistor is formed in the first semiconductor 154a between the first source electrode 173a and the first drain electrode 175a. Similarly, the second gate electrode 124b, the second source electrode 173b, and the second drain electrode 175b form a second thin-film transistor Qb together with a second semiconductor 154b formed as an island, and a channel is formed in the second semiconductor 154b between the second source electrode 173b and the second drain electrode 175b. The third gate electrode 124c, the third source electrode 173c, and the third drain electrode 175c form a third thin-film transistor Qc together with the third semiconductor 154c formed as an island, and a channel is formed in the third semiconductor 154c between the third source electrode 173c and the third drain electrode 175c. The second drain electrode 175b is connected to the third source electrode 173c.

A first passivation layer 180p is formed on the data conductor and exposed portions of the semiconductors 154a, 154b, and 154c. The first passivation layer 180p may include an inorganic insulating layer such as silicon nitride or silicon oxide. The first passivation layer 180p may prevent a pigment of a color filter 230 from flowing into the exposed portions of the semiconductors 154a, 154b, and 154c.

The color filter 230 is formed on the first passivation layer 180p. The color filter 230 extends in a vertical direction along with two adjacent data lines. Although not shown, a light blocking member may be formed in the first display panel 100. Alternatively, at least one of the color filter 230 and the light blocking member may be formed on the second display panel 200 rather than on the first display panel 100. When the color filter 230 is formed on the second display panel 200, the first passivation layer 180p may be formed of an organic layer.

A second passivation layer 180q is formed on the color filter 230. The second passivation layer 180q may include an inorganic insulating layer such as silicon nitride or silicon oxide. The second passivation layer 180q prevents peeling of the color filter 230 and suppresses contamination of the liquid crystal layer 3 by the organic material, such as a solvent that flows from the color filter 230, such that defects, for example, afterimages that may be generated during displaying an image, may be prevented. A first contact hole 185a and a second contact hole 185b through which the first drain electrode 175a and the second drain electrode 175b are exposed are formed in the first passivation layer 180p and the second passivation layer 180q.

Pixel electrodes 191 are formed on the second passivation layer 180q. The pixel electrodes 191 are separated from each other while the gate line 121 is interposed therebetween. Each of the pixel electrodes 191 includes the first sub-pixel electrode 191*a* and the second sub-pixel electrode 191*b* adjacent in a column direction with respect to the gate line 121. The pixel electrode 191 may be formed of a transparent material such as indium tin oxide (ITO) and indium zinc oxide (IZO). The pixel electrode 191 may be made of a transparent conductive material such as ITO or IZO, or a reflective metal such as aluminum, silver, chromium, or an alloy thereof.

The pixel electrode 191 of one pixel includes a base electrode 199 illustrated in FIG. 3 or one or more modifications thereof. A shape of the first sub-pixel electrode 191*a* of the pixel electrode 191 is quadrangular, and includes a crossed-shape stem including a first transverse stem 192*a* and a first longitudinal stem 193*a*, and branch electrodes 194 extending from the crossed-shape stem. A shape of the second sub-pixel electrode 191*b* of the pixel electrode 191 is quadrangle, and includes a crossed-shape stem including a second transverse stem 192*b* and a second longitudinal stem 193*b*, and branch electrodes 194 extending from the crossed-shape stem.

The first longitudinal stem 193*a* of the first sub-pixel electrode 191*a* of the pixel electrode 191 overlaps the first longitudinal portion 72*a* of the division voltage reference voltage line 172, and the second longitudinal stem 193*b* of the second sub-pixel electrode 191*b* of the pixel electrode 191 overlaps the second longitudinal portion 72*b* of the division voltage reference voltage line 172.

The first sub-pixel electrode 191*a* and the second sub-pixel electrode 191*b* are electrically and physically connected to the first drain electrode 175*a* and the second drain electrode 175*b* through the first contact hole 185*a* and the second contact hole 185*b*, respectively, thereby receiving the data voltage from the first drain electrode 175*a* and the second drain electrode 175*b*. In this case, a portion of the data voltage applied to the second drain electrode 175*b* is divided through the third source electrode 173*c*, and thus a magnitude of a voltage applied to the first sub-pixel electrode 191*a* is greater than a magnitude of a voltage applied to the second sub-pixel electrode 191*b*.

The first sub-pixel electrode 191*a* and the second sub-pixel electrode 191*b*, to which the data voltage is applied, generate an electric field together with a common electrode 270 of the second display panel 200, such that a direction of the liquid crystal molecules of the liquid crystal layer 3 between the two electrodes 191 and 270 may be determined. A luminance of light passing through the liquid crystal layer 3 may change according to the determined direction of the liquid crystal molecules.

A first alignment layer 11 is disposed on the pixel electrode 191 of the first substrate 110. The first alignment layer 11 is a vertical alignment layer and includes first photo-polymerization protrusions including a photo-reactive material. For example, the photo-reactive material may be a photo-polymerizable material.

Next, the second display panel 200 will be described.

A common electrode 270 is formed on a second substrate 210, which is an insulation substrate. A second alignment layer 21 is formed on the second substrate 210. The second alignment layer 21 is a vertical alignment layer and includes second photo-polymerization protrusions including a photo-reactive material. For example, the photo-reactive material may be a photo-polymerizable material. The first alignment layer 11 has a thickness greater than that of the second alignment layer 21.

As described above, the first alignment layer 11 includes the first photo-polymerization protrusions, and the second alignment layer 21 includes the second photo-polymerization protrusions. A density and an average size of the first photo-polymerization protrusions is greater than those of the second photo-polymerization protrusions. Accordingly, the thickness of the first alignment layer 11 is greater than that of the second alignment layer 21.

The liquid crystal layer 3 includes liquid crystal molecules 31 and absorption particles 35 absorbing ultraviolet (UV) light. The liquid crystal molecules 31 of the liquid crystal layer 3 have negative dielectric anisotropy and are arranged such that a longitudinal axis of the liquid crystal molecules may be perpendicular to the surfaces of the first and second display panels 100 and 200, when an electric field does not exist.

Next, the base electrode 199 of the liquid crystal display according to an exemplary embodiment of the present invention will be described with reference to FIG. 3.

As shown in FIG. 3, the base electrode 199 has a quadrangular shape and includes the crossed-shape stem including a transverse stem 192 and a longitudinal stem 193 crossing the transverse stem 192. The base electrode 199 is divided into a first sub-region Da, a second sub-region Db, a third sub-region Dc, and a fourth sub-region Dd, by the transverse stem 192 and the longitudinal stem 193. Each of the sub-regions Da, Db, Dc, and Dd includes the first minute branches 194*a*, the second minute branches 194*b*, the third minute branches 194*c*, and the fourth minute branches 194*d*, respectively.

The first minute branches 194*a* extend obliquely in an upper left direction from the transverse stem 192 or the longitudinal stem 193, and the second minute branches 194*b* extend obliquely in an upper right direction from the transverse stem 192 or the longitudinal stem 193. The third minute branches 194*c* extend in a lower left direction from the transverse stem 192 or the longitudinal stem 193, and the fourth minute branches 194*d* extend obliquely in a lower right direction from the transverse stem 192 or the longitudinal stem 193.

The first to fourth minute branches 194*a*, 194*b*, 194*c*, and 194*d* form an angle of approximately 45° or 135° with the gate lines 121 or the transverse stem 192. Further, the minute branches 194*a*, 194*b*, 194*c*, and 194*d* of two adjacent sub-regions Da, Db, Dc, and Dd may be orthogonal to each other.

The first sub-pixel electrode 191*a* and the second sub-pixel electrode 191*b* are connected to the first drain electrode 175*a* and the second drain electrode 175*b* through the first contact hole 185*a* and the second contact hole 185*b*, respectively, and receive the data voltage from the first drain electrode 175*a* and the second drain electrode 175*b*, respectively. In this case, sides of the first to fourth minute branch portions 194*a*, 194*b*, 194*c*, and 194*d* may distort an electric field and generate a horizontal component, which may determine an inclination direction of the liquid crystal molecules 31.

The horizontal component of the electric field is substantially parallel to the sides of the first to fourth minute branches 194*a*, 194*b*, 194*c*, and 194*d*, and accordingly, the liquid crystal molecules 31 are inclined in the direction substantially perpendicular to the sides of the first to fourth minute branch portions 194*a*, 194*b*, 194*c*, and 194*d*. The liquid crystal molecules 31 then collide with each other, thereby being inclined in the direction parallel to the length direction of the minute branch portions 194*a*, 194*b*, 194*c*, and 194*d*. Since one base electrode 199 includes four sub-regions Da, Db, Dc, and Dd, and longitudinal directions of the minute branches 194a, 194b, 194c, and 194d are different from each other, the liquid crystal molecules 31 are inclined to about four directions, and accordingly, the liquid crystal layer 3 includes four domains, of which the alignment directions of the liquid crystal molecules 31 are different from each other. As described above, when the inclination direction of the liquid crystal molecules is diversified, a reference viewing angle of the liquid crystal display may be increased.

Hereinafter, a method of manufacturing a display device according to an exemplary embodiment of the present invention will be described with reference to FIG. 4A to FIG. 4D.

Figure 4A:
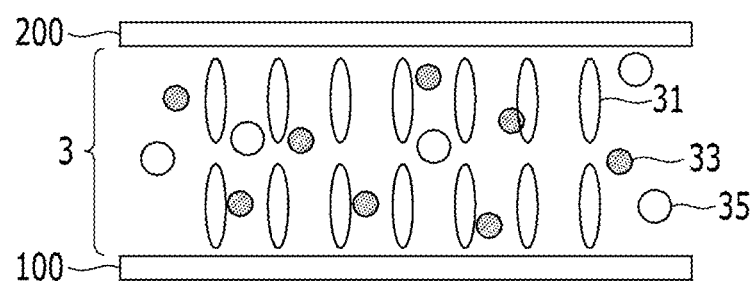
FIGS. 4A, 4B, 4C, and 4D show a method for manufacturing a liquid crystal display according to an exemplary embodiment of the present invention.

Referring to FIG. 4A, a liquid crystal layer 3 including the liquid crystal molecules 31, prepolymers 33, such as a monomer that is polymerized by light (e.g., ultraviolet light), and absorption particles 35 are injected between the first display panel 100 and the second display panel 200. The prepolymer 33 may be a reactive mesogen that is polymerized by light, such as ultraviolet light.

Figure 4B:
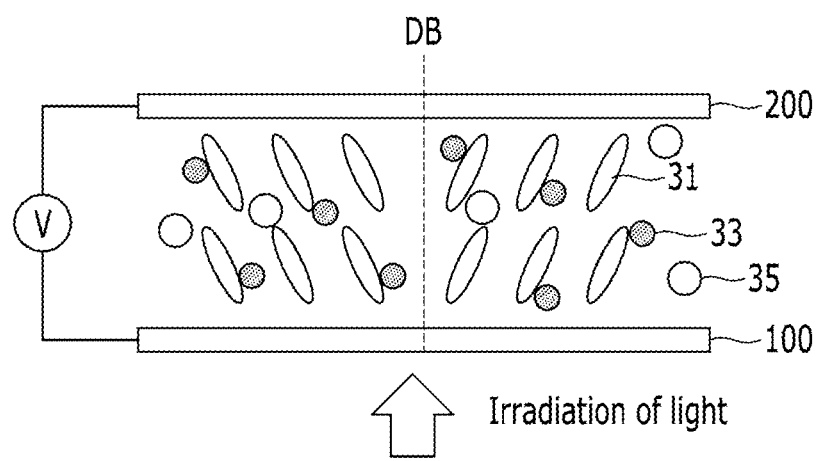

As shown in FIG. 4B, two electrodes such as the pixel electrode 191 and the common electrode 270 are respectively supplied with voltages, to form an electric field on the liquid crystal layer 3 including the liquid crystal molecules 31, the prepolymers 33, and the absorption particles 35 injected between the first display panel 100 and the second display panel 200. The liquid crystal molecules 31 of the liquid crystal layer 3 are then inclined in directions parallel to the longitudinal directions of the minute branches 194a, 194b, 194c, and 194d, in response to the electric field through two steps as described above, and thus, the liquid crystal molecules 31 may be inclined in four directions in one pixel. While the electric field is generated to align the liquid crystal molecules 31 in different directions with respect to domain boundaries (DB), light, such as ultraviolet light, is irradiated in the liquid crystal layer 3 toward the second display panel 200 from the first display panel 100.

Figure 4C:
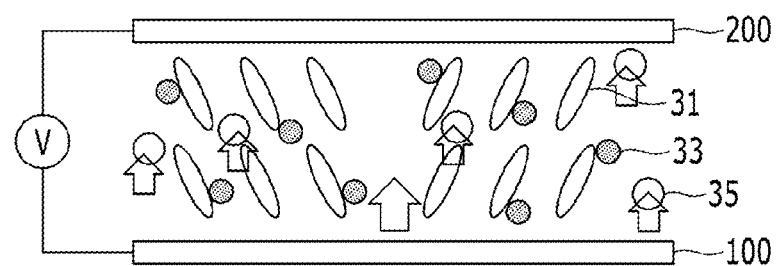

When light, such as ultraviolet light, is irradiated in the liquid crystal layer 3 in a direction toward the second display panel 200 from the first display panel 100, the light fully reaches the first display panel 100 and a portion of the light reaches the second display panel 200, because a portion of the light is absorbed by the absorption particles 35 while passing the liquid crystal layer 3 as shown in FIG. 4C. An ultraviolet (UV) absorbing ratio of the absorption particles 35 may be about 80% and more of the incident light.

Figure 4D:
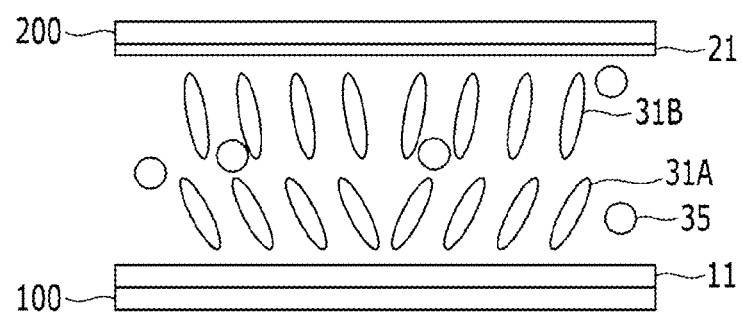

The prepolymer 33 is polymerized to form the first alignment layer 11 including the first photo-polymerization protrusions including a photo-polymerized material adjacent to the surface of the first display panel 100, as shown in FIG. 4D. The first alignment layer 11 includes the photo-polymerized material, and the photo-polymerization protrusions are formed in the first alignment layer 11. In addition, the prepolymer 33 is polymerized to form the second alignment layer 21 including the second photo-polymerization protrusions including the photo-polymerized material adjacent to the surface of the second display panel 200. The second alignment layer 21 includes a photo-polymerized material.

Here, the prepolymer 33 adjacent to the surface of the first display panel 100 is polymerized by relatively strong UV light and the prepolymer 33 adjacent to the surface of the second display panel 200 is polymerized by relatively weak UV light, to form the first alignment layer 11 and the second alignment layer 21, respectively. Accordingly, the density and the average size of the first photo-polymerization protrusions are greater than those of the second photo-polymerization protrusions.

First liquid crystal molecules 31A adjacent to the first display panel 100 including the first alignment layer 11 including the first photo-polymerization protrusions having a relatively large size and a relatively large average density are initially aligned to have first pretilt angles in four different directions, when voltages are not applied to the two electrodes 191 and 270 by the first photo-polymerization protrusions. Second liquid crystal molecules 31B adjacent to the second display panel 200 including the second alignment layer 21 including the second photo-polymerization protrusions having a relatively small size and a relatively small average density are initially aligned to have second pretilt angles in four different directions, when voltages are not applied to the two electrodes 191 and 270 by the second photo-polymerization protrusions. The second pretilt angles may be smaller than the first pretilt angles.

The pretilt angle is a smaller angle of two angles between the longitudinal axis of the liquid crystal molecules and an imaginary line perpendicular to the surfaces of the display panels. More particularly, "small pretilt angle" of the liquid crystal molecule may refer to that the liquid crystal molecule is substantially perpendicular to the surfaces of the display panels.

As described above, light is irradiated in the direction of the second display panel 200 from the first display panel 100, a portion of the irradiated light is absorbed by the absorption particles 35, and the absorbed portion of the irradiated light may not reach the second display panel 200. Accordingly, the first alignment layer 11 has a greater thickness than that of the second alignment layer 21, and the density and the average size of the first photo-polymerization protrusions of the first alignment layer 11 are greater than those of the second photo-polymerization protrusions of the second alignment layer 21. Accordingly, the second liquid crystal molecules 31B adjacent to the second display panel 200 are initially aligned to have a smaller pretilt angle than the first liquid crystal molecules 31A adjacent to the first display panel 100 when an electric field does not exist. More particularly, the second liquid crystal molecules 31B adjacent to the second display panel 200 are initially aligned to be substantially perpendicular to the surfaces of the second display panel 200.

Now, an additional step of the method for manufacturing a liquid crystal display according to an exemplary embodiment of the present invention will be described with reference to FIG. 5.

Figure 5:
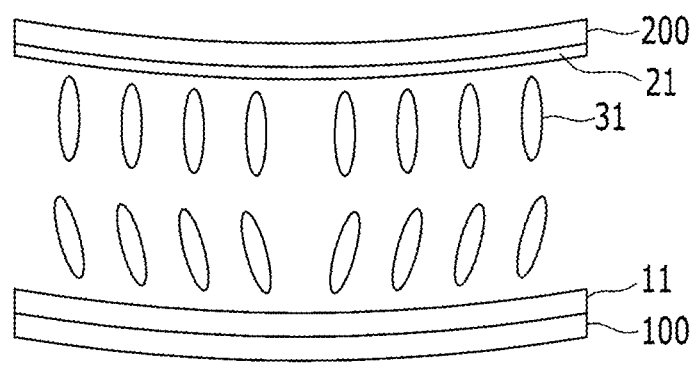
FIG. 5 shows an additional step of the method for manufacturing a liquid crystal display according to an exemplary embodiment of the present invention.

Referring to FIG. 5, an outside force is applied such that the first display panel 100 and the second display panel 200 are bent to have a curvature. An axis of the curvature may be parallel to at least one extending direction of the gate line and the data line. The first display panel 100 and the second display panel 200 may be bent to have a curvature to form a curved liquid crystal display (LCD).

Figure 6:
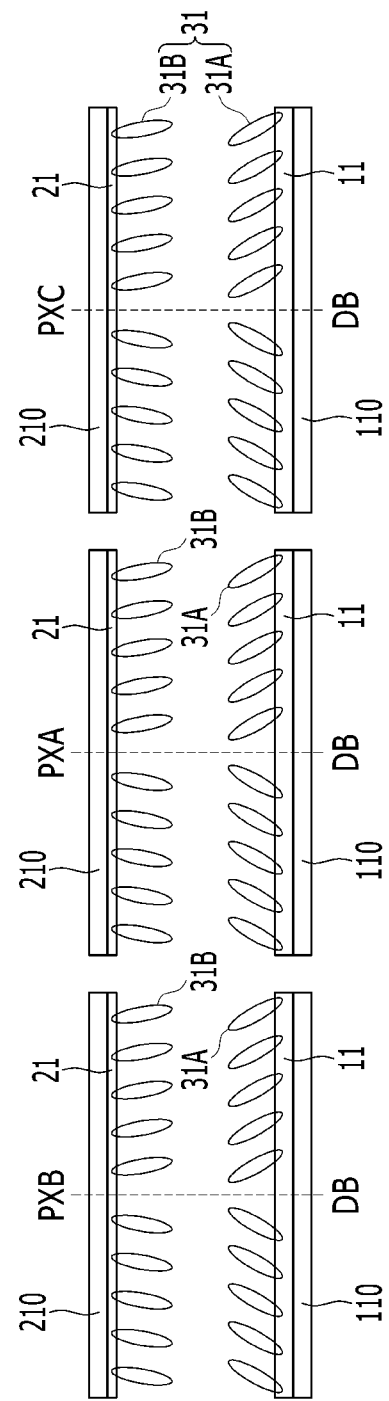
FIG. 6 and FIG. 7 are conceptual views showing a movement of liquid crystal molecules of a liquid crystal display according to an exemplary embodiment of the present invention.
Figure 7:
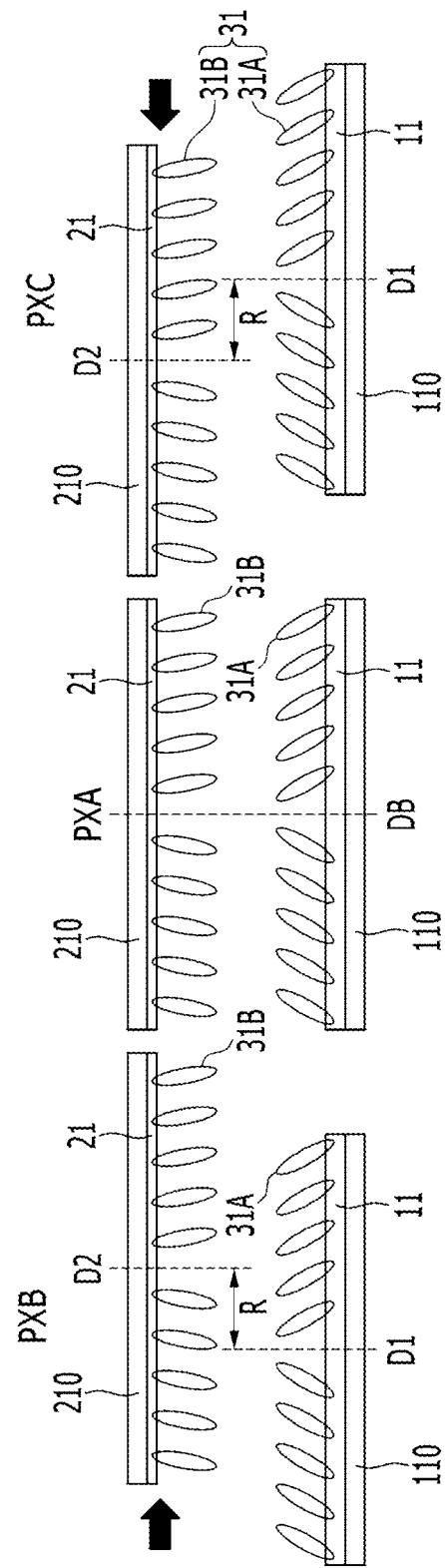

With reference to FIG. 6 and FIG. 7, behaviors of liquid crystal molecules of the liquid crystal display according to the present exemplary embodiment will be described. FIG. 6 and FIG. 7 are conceptual views showing a movement of liquid crystal molecules of a liquid crystal display according to the present exemplary embodiment.

Referring to FIG. 6, the liquid crystal display (LCD) according to the present exemplary embodiment includes a first pixel PXA disposed in a center of the liquid crystal display and a second pixel PXB and a third pixel PXC disposed in sides of the first pixel PXA.

The liquid crystal molecules 31 of the liquid crystal display (LCD) including the first pixel PXA, the second pixel PXB, and the third pixel PXC are aligned to have different pretilt angles with respect to domain boundary DB by the first alignment layer 11 and the second alignment layer 21.

The first liquid crystal molecules 31A adjacent to the first substrate 110, on which the first alignment layer 11 is formed, are aligned to have different pretilt angles with respect to the domain boundary DB. In addition, the second liquid crystal molecules 31B adjacent to the second substrate 210, on which the second alignment layer 21 is formed, are aligned to be substantially perpendicular to the surface of the second substrate 210. The pretilt angles of the first liquid crystal molecules 31A are larger than those of the second liquid crystal molecules 31B.

Accordingly, the second liquid crystal molecules 31B disposed adjacent to the second substrate 210, which are initially aligned to have relatively small pretilt angles, may be inclined according to the inclined directions of the first liquid crystal molecules 31A, which are disposed adjacent to the first substrate 110 and initially aligned to have relatively large pretilt angles.

When the outside force is applied to the liquid crystal display (LCD), a misalignment between the first substrate 110 and the second substrate 210 may be generated. The misalignment between the first substrate 110 and the second substrate 210 will be described with reference to FIG. 7.

Referring to FIG. 7, the misalignment between the first substrate 110 and the second substrate 210 is not generated in the first pixel PXA with respect to the domain boundary DB, however the first domain boundary D1 of the first substrate 110 and the second domain boundary D2 of the second substrate 210 are misaligned in the second pixel PXB and the third pixel PXC.

When the first liquid crystal molecules 31A disposed adjacent to the first substrate 110 and the second liquid crystal molecules 31B disposed adjacent to the second substrate 210 are aligned in the different directions from each other in a misalign position R, the pretilt direction in which the liquid crystal molecules 31 are inclined becomes irregular in the misalign position R and the direction in which the liquid crystal molecules 31 are inclined becomes irregular, which may deteriorate display quality.

However, in the liquid crystal display (LCD) according to the present exemplary embodiment, the first liquid crystal molecules 31A adjacent to the first substrate 110, on which the first alignment layer 11 is formed, are aligned to have different pretilt angles with respect to the domain boundary DB, and the second liquid crystal molecules 31B adjacent to the second substrate 210, on which the second alignment layer 21 is formed, are aligned to be substantially perpendicular to the surface of the second substrate 210. Accordingly, the second liquid crystal molecules 31B disposed in the misalign position R may be inclined according to aligned directions of the first liquid crystal molecules 31A, which are initially aligned by the first alignment layer 11.

Accordingly, irregular behaviors of the liquid crystal molecules 31 generated in the misalign position R may be prevented even though the misalignment is generated between the first substrate 110 and the second substrate 210. Therefore, deterioration of display quality generated by irregular behaviors of the liquid crystal molecules 31 may be prevented.

A liquid crystal display (LCD) and a method for manufacturing the liquid crystal display according to an exemplary embodiment of the present invention will be described with reference to with FIG. 8 and FIG. 9A to FIG. 9D, along with FIG. 1.

Figure 8:
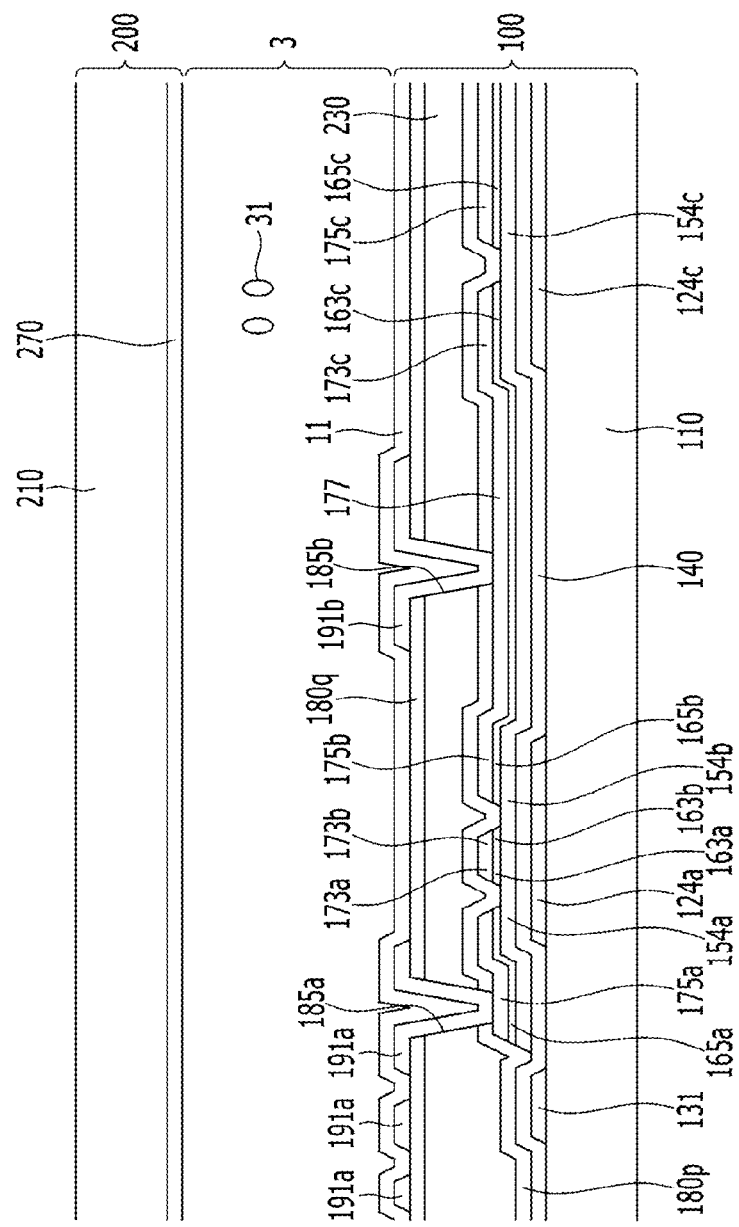
FIG. 8 is a cross-sectional view of a liquid crystal display according to an exemplary embodiment of the present invention taken along line II-II of FIG. 1.

FIG. 8 is a cross-sectional view of a liquid crystal display according to an exemplary embodiment of the present invention taken along line II-II of FIG. 1, and FIG. 9A to FIG. 9D show a method for manufacturing a liquid crystal display according to an exemplary embodiment of the present invention.

Referring to FIG. 1 and FIG. 8, the liquid crystal display according to the present exemplary embodiment may have substantially similar constituent elements to those of the liquid crystal display described with reference to FIG. 1 to FIG. 3, and thus, repeated description thereof will be omitted.

In the liquid crystal display according to the present exemplary embodiment, the first alignment layer 11 is formed on the first substrate 110, but the second alignment layer 21 is not formed on the second substrate 210. The first alignment layer 11 is a vertical alignment layer and includes photo-polymerization protrusions including a photo-reactive material. For example, the photo-reactive material may be a photo-polymerizable material.

Referring to FIG. 9A to FIG. 9D, a manufacturing method of the liquid crystal display according to the present exemplary embodiment is substantially similar to the manufacturing method of the liquid crystal display described with reference to FIG. 4A to FIG. 4D, and thus, repeated description thereof will be omitted.

Figure 9A:
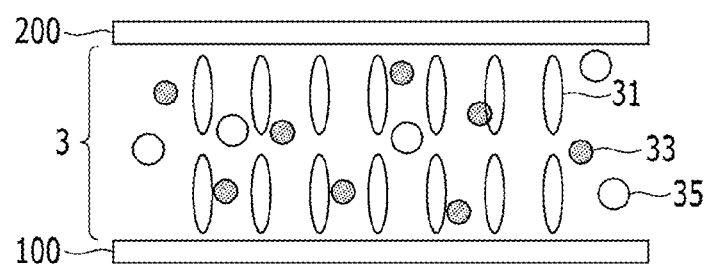
FIGS. 9A, 9B, 9C, and 9D show a method for manufacturing a liquid crystal display according to an exemplary embodiment of the present invention.

Referring to FIG. 9A, the liquid crystal layer 3 including the liquid crystal molecules 31, prepolymers 33 such as a monomer that is polymerized by light such as ultraviolet light, and absorption particles 35 are injected between the first display panel 100 and the second display panel 200.

Figure 9B:
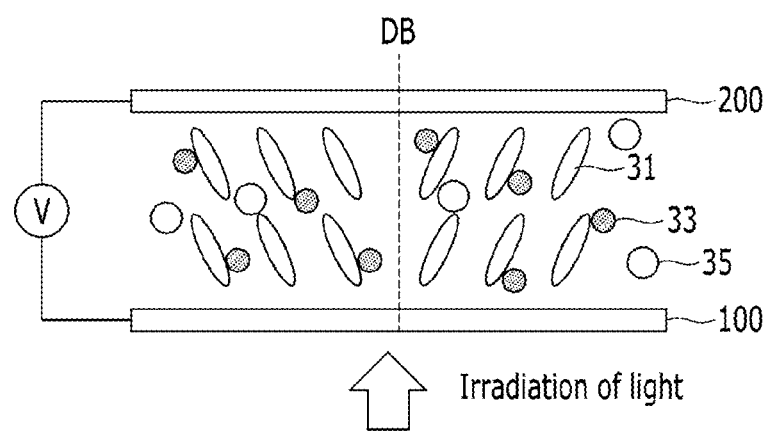

As shown in FIG. 9B, two electrodes such as the pixel electrode 191 and the common electrode 270 are respectively supplied with voltages to form an electric field on the liquid crystal layer 3 including the liquid crystal molecules 31, the prepolymers 33, and the absorption particles 35, such that the liquid crystal molecules 31 of the liquid crystal layer 3 are inclined in direction parallel to longitudinal directions of the minute branches 194a, 194b, 194c, and 194d, in response to the electric field through two steps as described above. The liquid crystal molecules 31 may be inclined in four different directions. While the electric field is generated to align the liquid crystal molecules 31 in different directions with respect to domain boundaries (DB), light such as ultraviolet light is irradiated in the liquid crystal layer 3 toward the second display panel 200 from the first display panel 100.

Figure 9C:
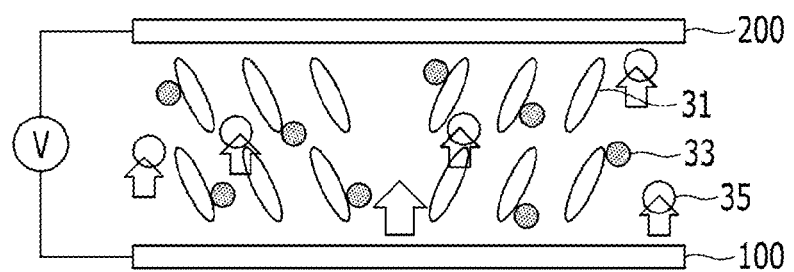

When the light such as ultraviolet light is irradiated in the liquid crystal layer 3 in a direction toward the second display panel 200 from the first display panel 100, the light fully reaches the first display panel 100, but the light may not reach the second display panel 200, because the light is absorbed by the absorption particles 35 while passing the liquid crystal layer 3 as shown in FIG. 9C. An ultraviolet (UV) absorbing ratio of the absorption particles 35 may be about 80% and more of the incident light.

Figure 9D:
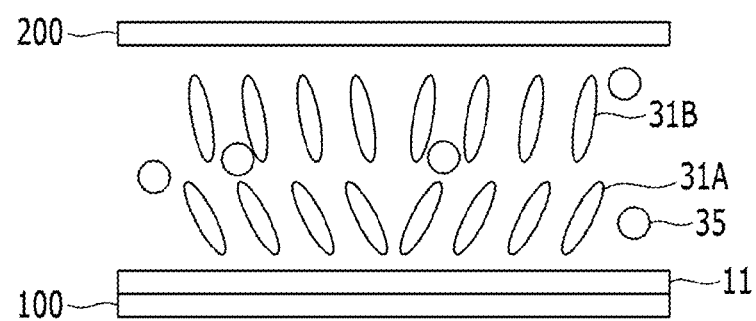

The prepolymer 33 is polymerized to form the first alignment layer 11 including the first photo-polymerization protrusions including a photo-polymerized material adjacent to the surface of the first display panel 100 as shown in FIG. 9D. The first alignment layer 11 includes a photo-polymerized material, and the photo-polymerization protrusions are formed in the first alignment layer 11.

The first liquid crystal molecules 31A adjacent to the first display panel 100 including the first alignment layer 11 including the photo-polymerization protrusions are initially aligned to have first pretilt angles in four different directions when voltages are not applied to the two electrodes 191 and 270 by the photo-polymerization protrusions. However, the second liquid crystal molecules 31B adjacent to the second display panel 200 where the second alignment layer is not formed are initially aligned to be substantially perpendicular to the surfaces of the second display panel 200 when the voltages are not applied to the two electrodes 191 and 270.

As described above, when light is irradiated in the direction toward the second display panel 200 from the first display panel 100, the irradiated light may be absorbed by the absorption particles 35, such that the irradiated light may not reach the second display panel 200. Accordingly, a second alignment layer including the photo-polymerization protrusions may not be formed on the second display panel 200. Accordingly, the second liquid crystal molecules 31B adjacent to the second display panel 200 are initially aligned to be substantially perpendicular to the surfaces of the second display panel 200.

Figure 10:
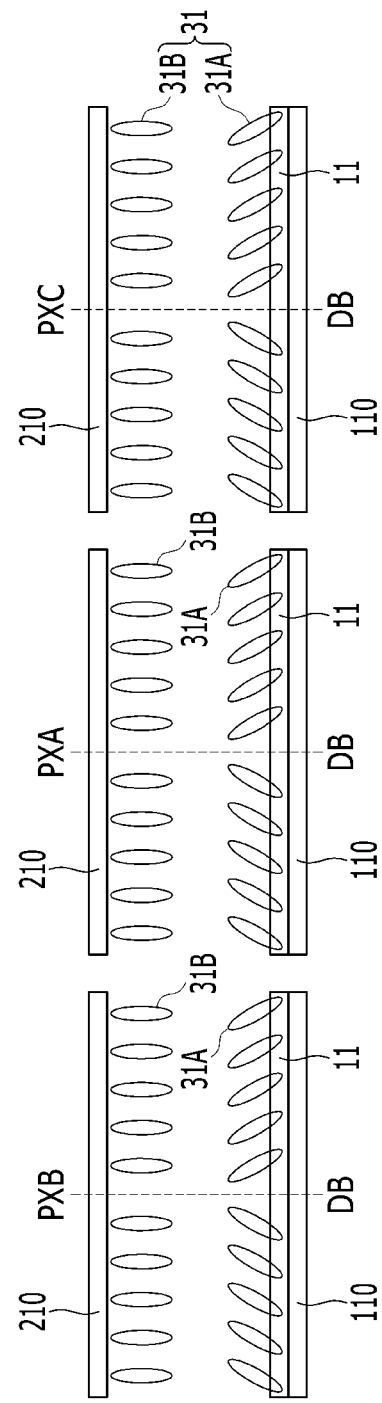
FIG. 10 and FIG. 11 are conceptual views showing a movement of liquid crystal molecules of a liquid crystal display according to an exemplary embodiment of the present invention.
Figure 11:
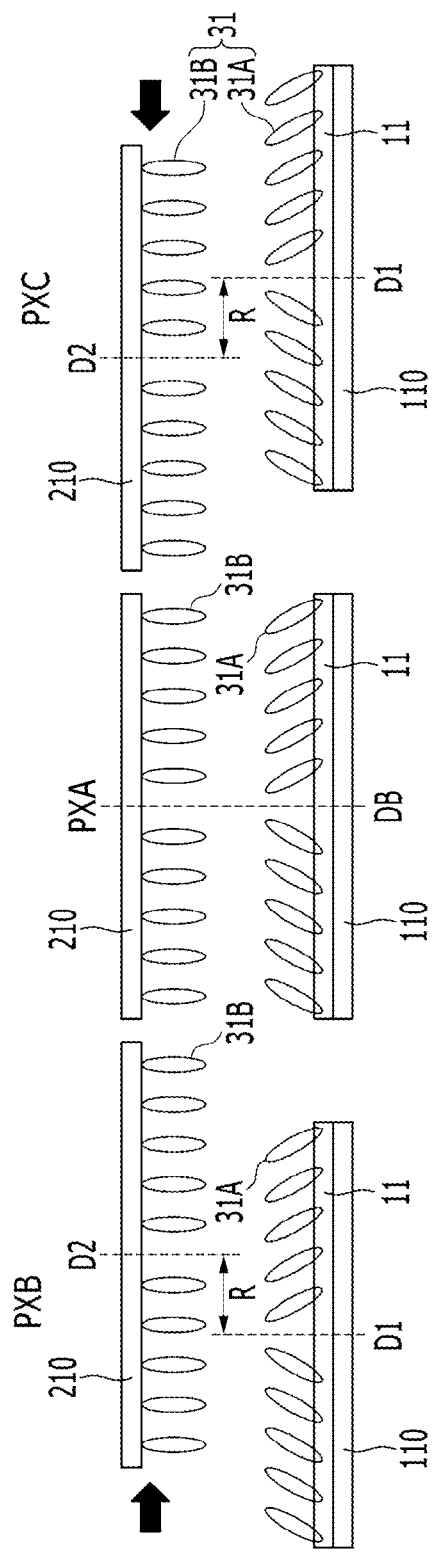

Referring to FIG. 10 and FIG. 11, behaviors of liquid crystal molecules of the liquid crystal display according to the present exemplary embodiment will be described. FIG. 10 and FIG. 11 are conceptual views showing a movement of liquid crystal molecules of a liquid crystal display according to the present exemplary embodiment.

Referring to FIG. 10, the liquid crystal molecules 31 of the liquid crystal display (LCD) including the first pixel PXA, the second pixel PXB, and the third pixel PXC are aligned to have different pretilt angles with respect to domain boundary DB by the first alignment layer 11.

The first liquid crystal molecules 31A adjacent to the first substrate 110, on which the first alignment layer 11 is formed, are aligned to have different pretilt angles with respect to the domain boundary DB, and the second liquid crystal molecules 31B adjacent to the second substrate 210, on which the second alignment layer 21 is not formed, are aligned to be substantially perpendicular to the surface of the second substrate 210. The second liquid crystal molecules 31B disposed adjacent to the second substrate 210 may be inclined according to the inclined directions of the first liquid crystal molecules 31A are disposed adjacent to the first substrate 110.

A misalignment generated between the first substrate 110 and the second substrate 210 will be described with reference to FIG. 11.

Referring to FIG. 11, the misalignment between the first substrate 110 and the second substrate 210 is not generated in the first pixel PXA with respect to the domain boundary DB, however the first domain boundary D1 of the first substrate 110 and the second domain boundary D2 of the second substrate 210 are misaligned in the second pixel PXB and the third pixel PXC.

The first liquid crystal molecules 31A adjacent to the first substrate 110, on which the first alignment layer 11 is formed, are aligned to have different pretilt angles with respect to the domain boundary DB, and the second liquid crystal molecules 31B adjacent to the second substrate 210, on which the second alignment layer 21 is not formed, are aligned to be substantially perpendicular to the surface of the second substrate 210. Accordingly, the second liquid crystal molecules 31B disposed in the misalign position R may be inclined according to aligned directions of the first liquid crystal molecules 31A that are initially aligned by the first alignment layer 11.

Accordingly, irregular behaviors of the liquid crystal molecules 31 in the misalign position R may be prevented, when the misalignment is generated between the first substrate 110 and the second substrate 210. Therefore, deterioration of display quality generated by irregular behaviors of the liquid crystal molecules 31 may be prevented.

Figure 12A:
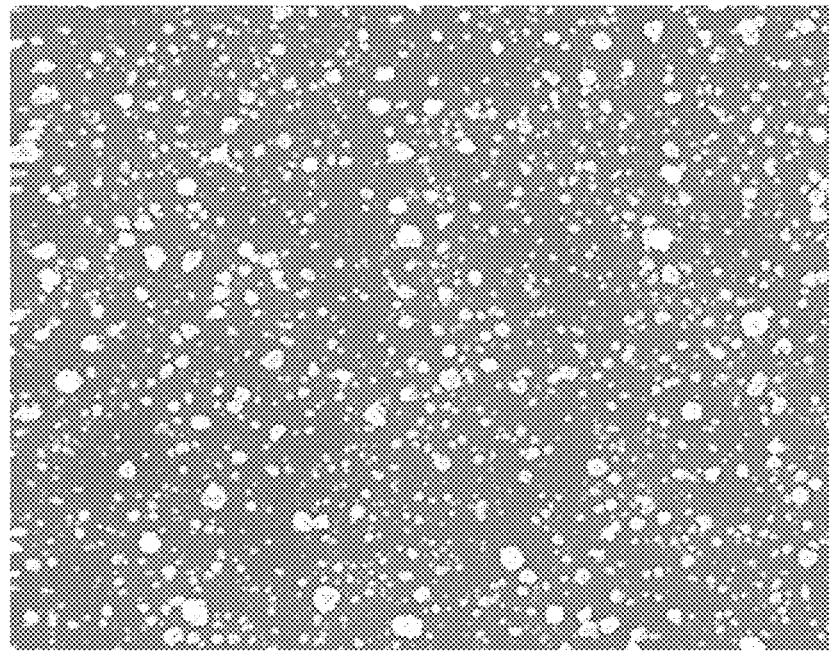
FIG. 12A and FIG. 12B are electron microscope views showing a surface of the substrate according to an exemplary embodiment of the present invention.
Figure 12B:
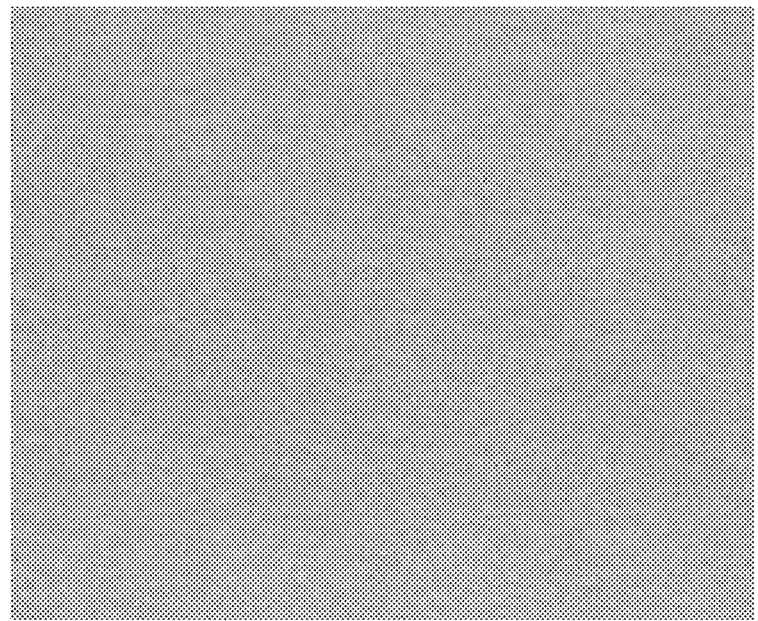

An experimental example according to an exemplary embodiment of the present invention will be described with reference to FIG. 12A and FIG. 12B. FIG. 12A and FIG. 12B are electron microscope views showing a surface of a substrate according to the experimental example of the present invention.

In the experimental example, a liquid crystal display (LCD) is formed according to an exemplary embodiment of the present invention, and pictures of surfaces of the first display panel 100 and the second display panel 200 captured by the electron microscope are shown in FIG. 12A and FIG. 12B. FIG. 12A shows the surface of the first display panel 100 and FIG. 12B shows the surface of the second display panel 200.

Referring to FIG. 12A, the first alignment layer 11 including the first photo-polymerization protrusions having a relatively large size and a relatively large average density is formed on the surface of the first display panel 100. Referring to FIG. 12B, the second alignment layer 21 including the second photo-polymerization protrusions having a relatively small size and a relatively small average density is formed on the surface of the second display panel 200.

When light is irradiated in the direction of the second display panel 200 from the first display panel 100, in which the liquid crystal layer 3 including the ultraviolet (UV) absorption particles 35 is disposed therebetween, a portion of the irradiated light is absorbed by the absorption particles 35, and the absorbed portion of the irradiated light may not reach the second display panel 200. Accordingly, the second alignment layer 21 including the second photo-polymerization protrusions having a relatively small size and a relatively small average density is formed on the surface of the second display panel 200.

Figure 13A:
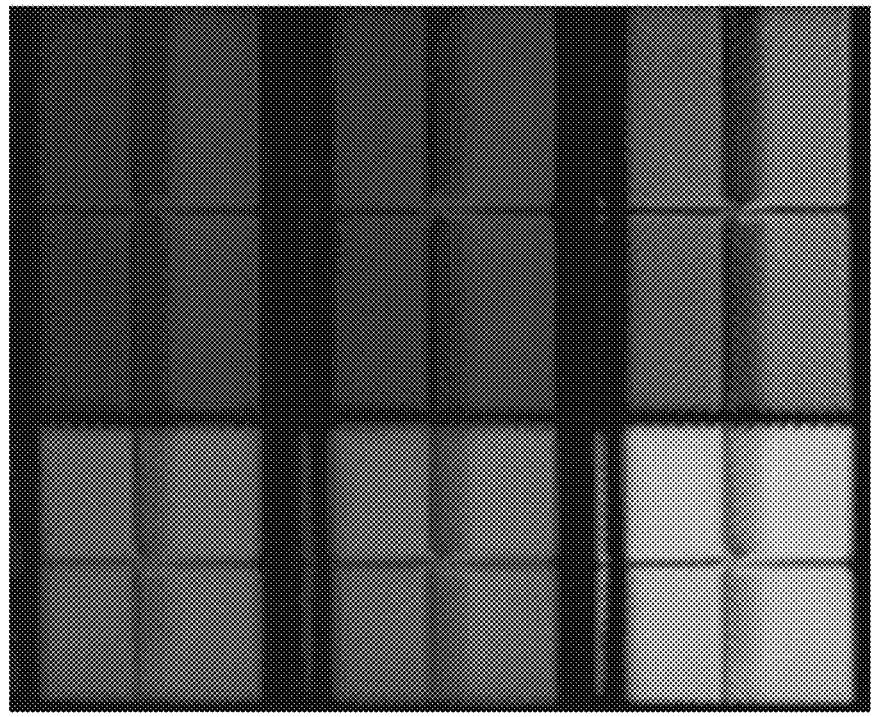
FIG. 13A and FIG. 13B are electron microscope views showing a result of an exemplary embodiment of the present invention.
Figure 13B:
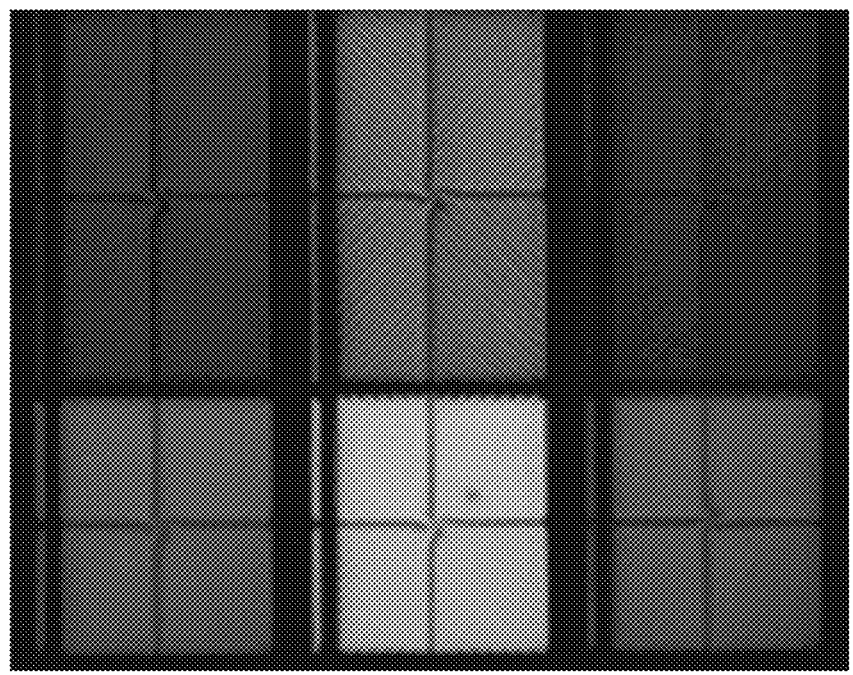

Hereinafter, a second experimental example according to an exemplary embodiment of the present invention will be described with reference to FIG. 13A and FIG. 13B. FIG. 13A and FIG. 13B are electron microscope views showing a result of the second experimental example.

In the second experimental example, an external force is applied to a liquid crystal display (LCD) according to a comparative embodiment and a liquid crystal display (LCD) according to an exemplary embodiment of the present invention, such that a misalignment is generated between first and second display panels. Transmittance results are measured for each LCD and the results are depicted in FIG. 13A and FIG. 13B, respectively.

The liquid crystal display (LCD) according to the comparative embodiment includes first and second display panels including alignment layers that include the same photo-polymerization protrusions. Referring to FIG. 13A, the transmittance of the liquid crystal display (LCD) according to the comparative embodiment is deteriorated in the misalign position R adjacent to boundaries of the domains.

In the liquid crystal display (LCD) according to the present exemplary embodiment, the first alignment layer 11 of the first display panel 100 has a larger thickness than that of the second alignment layer 21 of the second display panel 200, and the density and the average size of the first photo-polymerization protrusions of the first alignment layer 11 of the first display panel 100 are greater than those of the second photo-polymerization protrusions of the second alignment layer 21 of the second display panel 200. Referring to FIG. 13B, according to the present exemplary embodiment, the deterioration of display quality is prevented in the misalign position R adjacent to boundaries of the domains.

In a liquid crystal display (LCD) and a manufacturing method of the liquid crystal display according to an exemplary embodiment of the present invention, a first alignment layer including first photo-polymerization protrusions having a relatively large size and a relatively large average density is formed on a surface of the first display panel, and a second alignment layer including second photo-polymerization protrusions having a relatively small size and a relatively small average density is formed on a surface of the second display panel or the second alignment layer is not formed on the surface of the second display panel. Therefore, the liquid crystal molecules disposed adjacent to the second display panel may be inclined according to aligned directions of liquid crystal molecules disposed adjacent to the first display panel, such that the deterioration of display quality is prevented in the misalign position adjacent to boundaries of the domains.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A liquid crystal display (LCD), comprising:
   a first substrate;
   a gate line and a data line disposed on the first substrate;
   a pixel electrode connected to the gate line and the data line;
   a first alignment layer disposed on the pixel electrode and comprising first photo-polymerization protrusions formed therein;
   a second substrate opposing the first substrate;
   a common electrode disposed on the second substrate; and
   a second alignment layer disposed on the common electrode and comprising second photo-polymerization protrusions formed therein,
   wherein:
   a thickness of the first alignment layer is greater than a thickness of the second alignment layer; and
   a density and a size of the first photo-polymerization protrusions are greater than a density and a size of the second photo-polymerization protrusions.

2. The liquid crystal display of claim 1, wherein the liquid crystal display (LCD) has a curvature.

3. The liquid crystal display of claim 2, wherein an axis of the curvature is parallel to at least one extending direction of the gate line and the data line.

4. The liquid crystal display of claim 3, further comprising a liquid crystal layer disposed between the first substrate and the second substrate, the liquid crystal layer comprising ultraviolet (UV) light absorption particles.

5. The liquid crystal display of claim 1, further comprising a liquid crystal layer disposed between the first substrate and the second substrate, the liquid crystal layer comprising ultraviolet (UV) light absorption particles.

6. A liquid crystal display (LCD), comprising:
   a first substrate;
   a gate line and a data line disposed on the first substrate;
   a pixel electrode connected to the gate line and the data line;
   an alignment layer disposed on the pixel electrode, the alignment layer comprising photo-polymerization protrusions formed therein;
   a second substrate opposing the first substrate; and
   a common electrode disposed on the second substrate,
   wherein any alignment layer is not disposed on the common electrode.

7. The liquid crystal display of claim 6, wherein the liquid crystal display (LCD) has a curvature.

8. The liquid crystal display of claim 7, wherein an axis of the curvature is parallel to at least one extending direction of the gate line and the data line.

9. The liquid crystal display of claim 8, further comprising a liquid crystal layer disposed between the first substrate and the second substrate, the liquid crystal layer comprising ultraviolet (UV) light absorption particles.

10. The liquid crystal display of claim 6, further comprising a liquid crystal layer disposed between the first substrate and the second substrate, the liquid crystal layer comprising ultraviolet (UV) light absorption particles.

11. A method of manufacturing a liquid crystal display, the method comprising:
    forming a display panel comprising a first substrate and a second substrate opposing each other and a liquid crystal layer disposed between the first substrate and the second substrate; and
    applying ultraviolet (UV) light to the display panel in a direction toward the second substrate from outside the first substrate after the display panel is formed, to form a first alignment layer on the first substrate and a second alignment layer on the second substrate,
    wherein:
    a thickness of the first alignment layer is greater than a thickness of the second alignment layer;
    the first alignment layer comprises first photo-polymerization protrusions formed therein and the second alignment layer comprises second photo-polymerization protrusions formed therein; and
    a density and a size of the first photo-polymerization protrusions are greater than a density and a size of the second photo-polymerization protrusions.

12. The method of claim 11, further comprising applying an external force to the display panel after forming the first alignment layer and the second alignment layer, such that the display panel has a curvature.

13. The method of claim 12, further comprising forming a gate line and a data line on the first substrate,
    wherein an axis of the curvature of the display panel is parallel to at least one extending direction of the gate line and the data line.

14. The method of claim 13, wherein the liquid crystal layer further comprises ultraviolet (UV) light absorption particles.

15. The method of claim 11, wherein the liquid crystal layer further comprises ultraviolet (UV) light absorption particles.

16. A method of manufacturing a liquid crystal display, the method comprising:
    forming a display panel comprising a first substrate and a second substrate opposing each other and a liquid crystal layer disposed between the first substrate and the second substrate; and
    applying ultraviolet (UV) light to the display panel in a direction toward the second substrate from outside the first substrate after the display panel is formed to form an alignment layer on the first substrate, the alignment layer comprising photo-polymerization protrusions, wherein the ultraviolet light is absorbed by the liquid crystal layer so as not to reach the second substrate, and any alignment layer is not formed on the second substrate.

17. The method of claim 16, further comprising applying an external force to the display panel after forming the alignment layer, such that the display panel has a curvature.

18. The method of claim 17, further comprising forming a gate line and a data line on the first substrate,
wherein an axis of the curvature of the display panel is parallel to at least one extending direction of the gate line and the data line.

19. The method of claim 18, wherein the liquid crystal layer further comprises ultraviolet (UV) light absorption particles.

20. The method of claim 16, wherein the liquid crystal layer further comprises ultraviolet (UV) light absorption particles.

* * * * *